(No Model.) 4 Sheets—Sheet 1.
A. G. INGALLS.
CENTRIFUGAL DISH WASHER.
No. 355,088. Patented Dec. 28, 1886.
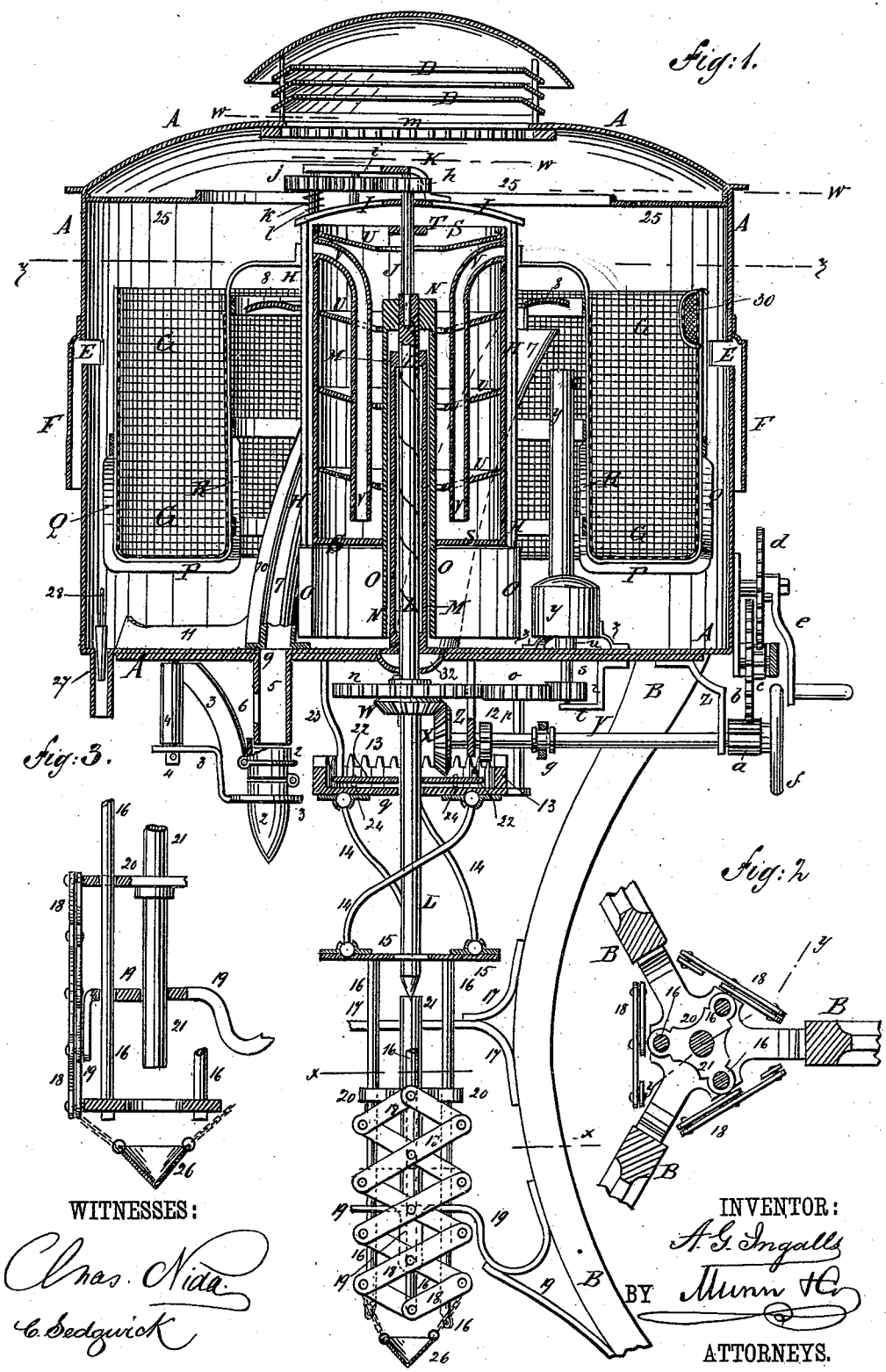
WITNESSES:
Chas. Nida
C. Sedgwick
INVENTOR:
A. G. Ingalls
BY Munn & Co.
ATTORNEYS.

(No Model.)  4 Sheets—Sheet 2.

A. G. INGALLS.
CENTRIFUGAL DISH WASHER.

No. 355,088. Patented Dec. 28, 1886.

WITNESSES:
Chas. Nida
C. Sedgwick

INVENTOR:
A. G. Ingalls
BY Munn & Co
ATTORNEYS.

(No Model.) 4 Sheets—Sheet 3.
A. G. INGALLS.
CENTRIFUGAL DISH WASHER.
No. 355,088. Patented Dec. 28, 1886.
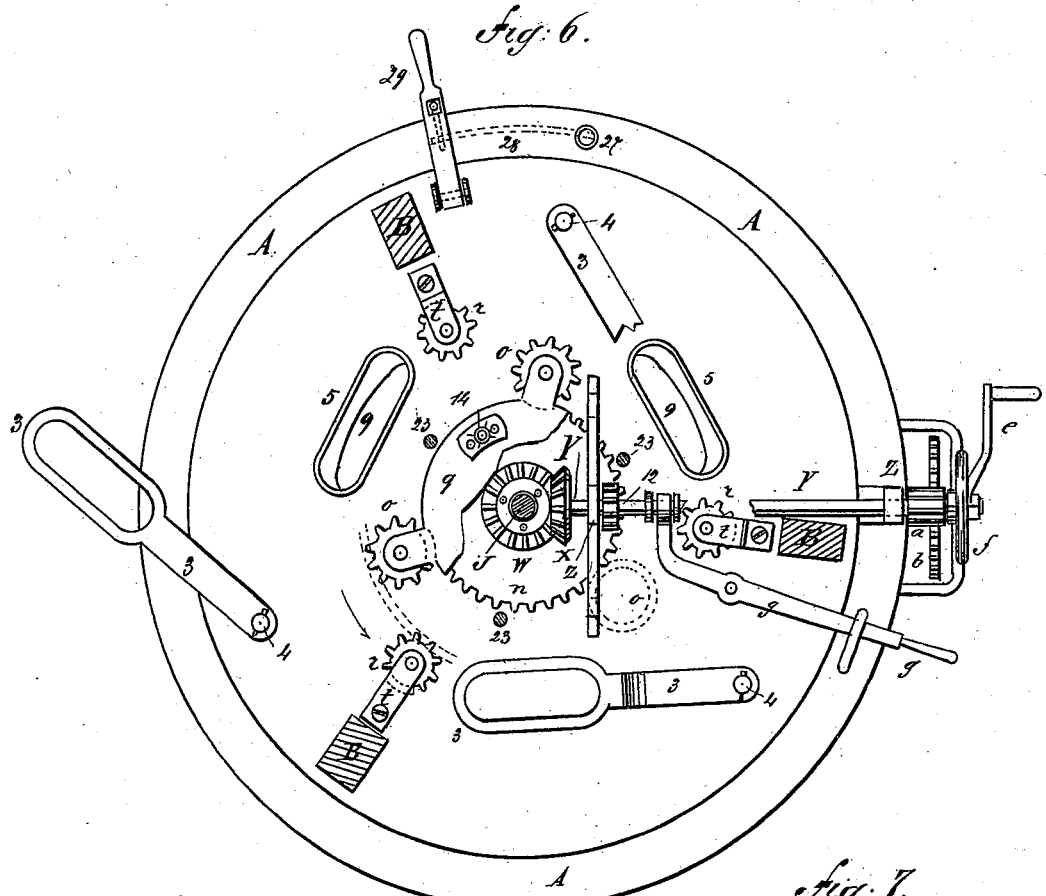
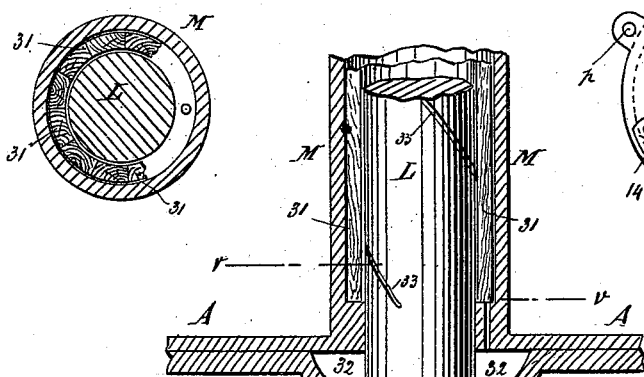
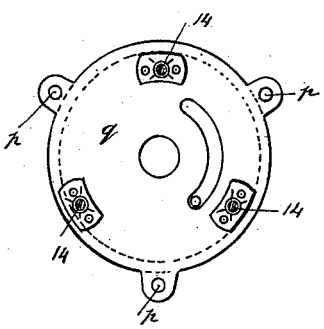
WITNESSES:
Chas. Nida
C. Sedgwick
INVENTOR:
A. G. Ingalls
BY Munn & Co.
ATTORNEYS.

(No Model.) 4 Sheets—Sheet 4.

A. G. INGALLS.
CENTRIFUGAL DISH WASHER.

No. 355,088. Patented Dec. 28, 1886.

WITNESSES:
Chas. Nida
C. Sedgwick

INVENTOR:
A. G. Ingalls
BY Munn & Co.
ATTORNEYS.

UNITED STATES PATENT OFFICE.

ALLEN G. INGALLS, OF GRANBY, QUEBEC, CANADA.

CENTRIFUGAL DISH-WASHER.

SPECIFICATION forming part of Letters Patent No. 355,088, dated December 28, 1886.

Application filed February 2, 1886. Serial No. 190,618. (No model.)

*To all whom it may concern:*

Be it known that I, ALLEN GARDINER INGALLS, of Granby, in the county of Shefford, in the Province of Quebec and Dominion of Canada, have invented a new and useful Centrifugal Dish-Washer, of which the following is a full, clear, and exact description.

Reference is to be had to the accompanying drawings, forming a part of this specification, in which similar letters of reference indicate corresponding parts in all the figures.

Figure 4:
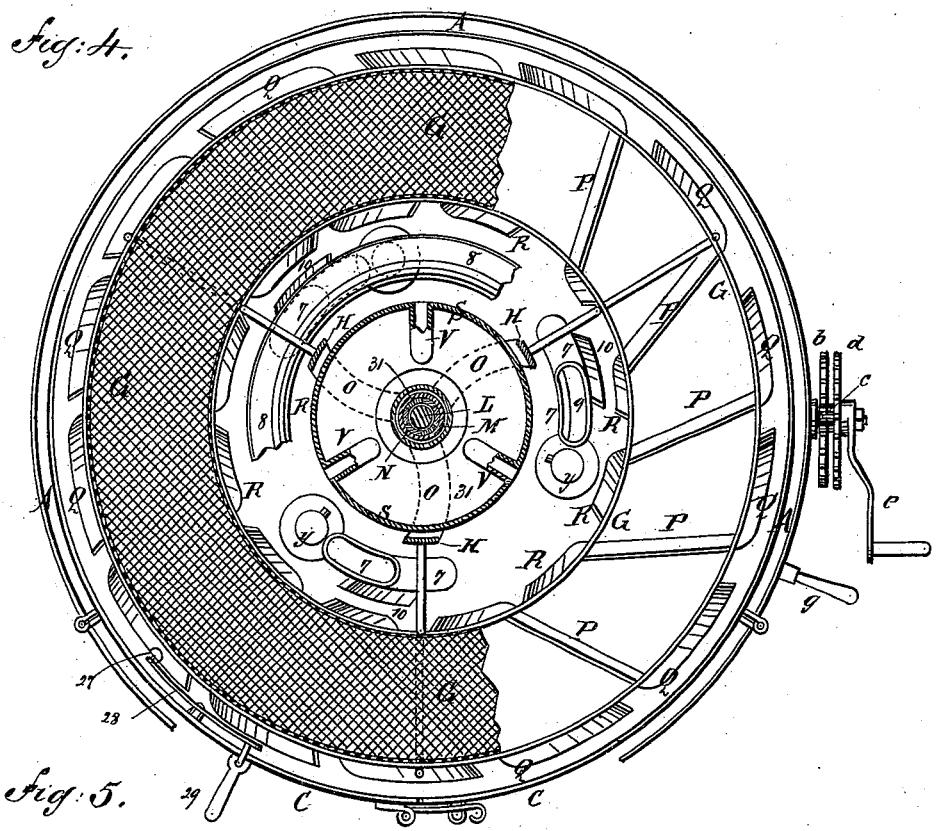
Figure 5:
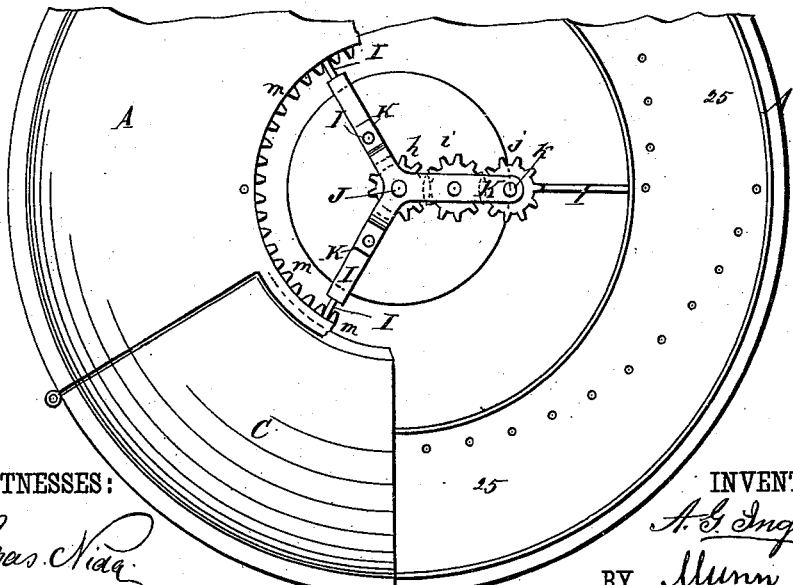
Figure 11:
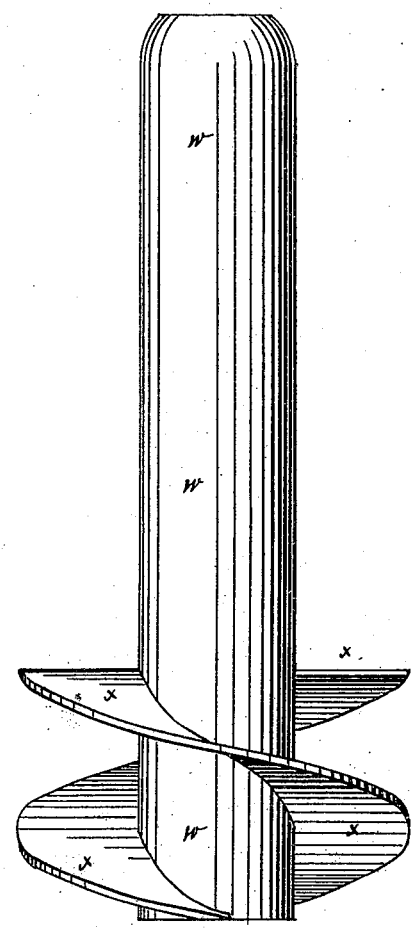
Figure 10:
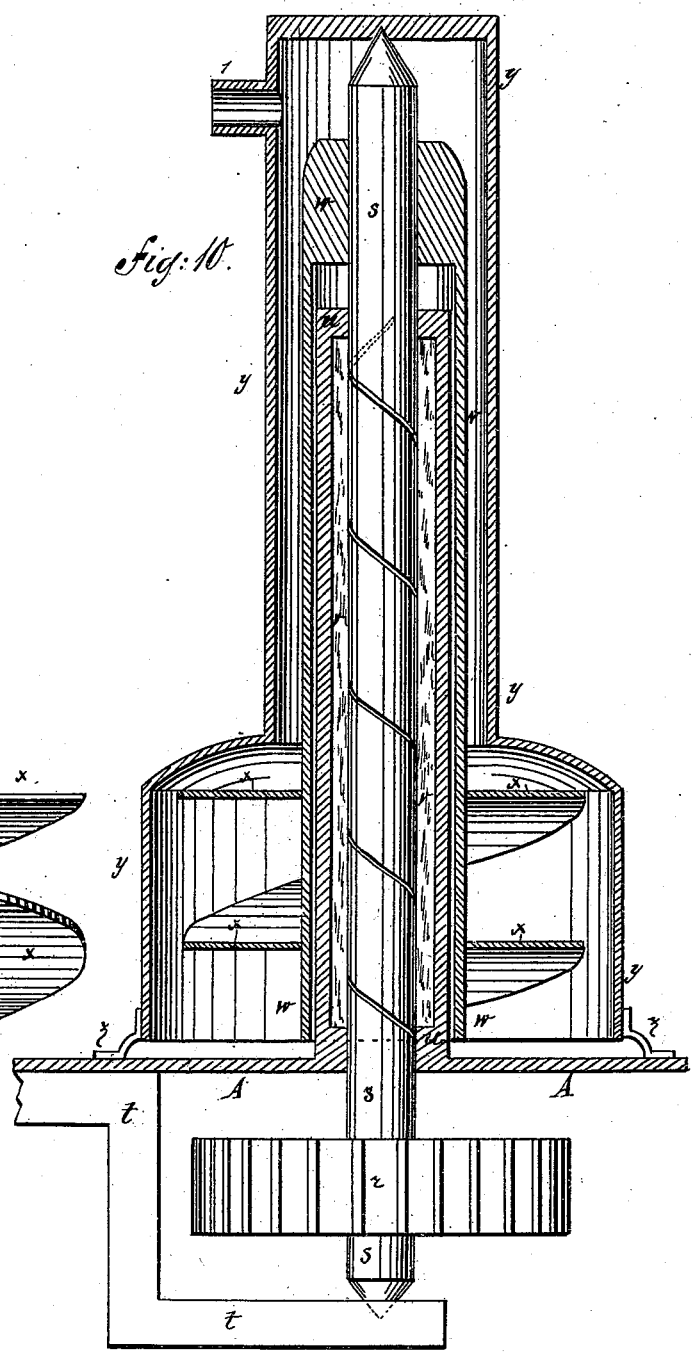

Figure 1 is a sectional side elevation of my centrifugal dish-washer. Fig. 2 is a sectional plan view of a part of the same, taken through the line $xx$, Fig. 1. Fig. 3 is a sectional side elevation of a part of the same, taken through the line $yy$, Fig. 2. Fig. 4 is a sectional plan view of the same, taken through the line $zz$, Fig. 1, part being broken away. Fig. 5 is a plan view of the same, partly in section, through the line $ww$, Fig. 1. Fig. 6 is a bottom view of the same, the supporting-frame being shown in section and parts being broken away. Fig. 7 is a bottom view of the crown-wheel plate connected with the lazy-tongs, the connecting-rods being shown in section. Fig. 8 is a side elevation, partly in section, of the part of the main shaft that passes through the bottom of the tank, the appliances to the said part of the main shaft being shown in section. Fig. 9 is a sectional plan view of the same, taken through the line $vv$, Fig. 8. Fig. 10 is a sectional side elevation of one of the pumps. Fig. 11 is a side elevation of a part of the same.

The object of this invention is to provide centrifugal dish-washers constructed in such a manner that the dishes can be quickly and thoroughly washed, rinsed, and dried by the operation of the machine.

The invention consists in the construction and combination of various parts of the machine, as will be hereinafter fully described, and pointed out in the claims.

A represents the tank of the machine, which may be of any desired size, as the quantity of dishes to be washed at a time may require, and which is designed to contain water for washing the dishes. The tank A is attached to and supported by a frame, B, which may be made in any convenient manner, but which should have a wide and heavy base to give the machine a firm and stable support.

The tank A is provided at its top and the upper part of one side with doors C, to give convenient access to the interior of the said tank. The tank A is made with a central top opening, in which is secured a ventilator, D, to allow the products of combustion and the generated steam to escape freely. The tank A is also made with side openings, E, covered with downwardly-projecting aprons or flanges F, to admit air to assist in carrying off the products of combustion and the steam, and in drying and cooling the dishes.

Within the outer part of the tank A is placed an annular basket, G, which is made U-shaped in its cross-section, as shown in Fig. 1, and is formed by attaching a coarse-meshed wire-cloth to a suitable frame. The upper ends of the inner bars of the basket-frame are bent inward and upward, and are attached to the upright bars H. The upper ends of the bars H are attached to the radial arms of the spider I, through a bearing in the center of which passes the spindle J, and which turns freely upon the said spindle. The upper end of the spindle J is pointed and revolves in a socket in a bracket, K, attached to the spider I. The lower end of the spindle J is pointed and revolves in a socket in the upper end of the main shaft L. The shaft L passes through an opening in the center of the bottom of the tank A, and its lower end is pointed and revolves in a socket in the upper end of a step, hereinafter described.

To the bottom of the tank A, around the shaft-opening, is attached the lower end of a tube, M, to prevent the water from leaking out of the said tank around the shaft L. The ends of the tube M are thickened or provided with interior collars to form bearings for the shaft L. Into the interior of the tube M are fitted strips 31, of pine or other porous wood, forming a wooden tube, through which the lubricating-oil percolates.

To the bottom of the tank A is attached an oil-cup, 32, through the bottom of which the shaft L passes. In the shaft L is formed a spiral groove, 33, the upper end of which terminates at a hole leading into the upper part of the socket in which the lower end of the spindle J revolves. From the lower part of the socket in the upper end of the shaft L is formed a hole leading to the interior of the upper end of the guard-tube M, so that oil from the oil-cup 32 will be carried up the shaft L by the groove 33, will pass from the socket in the upper end of the shaft L to the upper ends of the wooden packing 31, and will percolate through the said packing back to the oil-cup 32, keeping the shaft L and the lower end of the spindle J lubricated. Enough oil will be carried below the oil-cup 32 by the up and down movements of the shaft L to keep the lower parts of the said shaft lubricated.

To the upper end of the main shaft L is securely attached the thickened upper end of a tube, N, of such a size as to receive within it the guard-tube M and move up and down upon it freely, so that the said tube N will move up and down with the shaft L. To the lower part of the cap-tube N are rigidly attached the inner ends of wings O, which are curved to the rearward and are attached at their outer ends to the lower ends of the upright bars H, so that the dish-basket G will be supported from the main shaft L, and will be carried around by and with the said shaft in its revolution.

To the bottom of the basket G are attached flanges P, which are placed at an angle of about forty-five degrees (45°) with the length of the said basket, and with their outer ends forward and their lower edges at a forward inclination of about forty-five degrees, (45°.) To the outer surface of the outer side of the basket G are attached flanges Q, the upper ends of which incline forward at an angle of about forty-five degrees, (45°.) The outer edges of the flanges Q also incline forward at an angle of about forty-five degrees, (45°.) To the outer surface of the inner side of the basket G are attached flanges R, the upper ends of which incline to the rearward at an angle of about forty-five degrees, (45°,) while their outer edges incline forward at about the same angle. The flanges Q R serve as continuations of the flanges P, and may be made in one piece therewith.

Within the circle of the upright bars H is placed a bucket, S, through the center of the bottom of which the cap-tube N passes water-tight, or nearly so, and the upper end of which is rigidly connected with the spindle J by a cross-bar, T, or other suitable means, so that the said bucket will be supported by the said spindle and will be carried around by and with the said spindle in its revolution. The bucket S terminates above the wings O, so as to leave space below it for the revolution of the said wings. The interior of the bucket S is divided into compartments by transverse partitions U, secured at their outer edges to the wall of the bucket S. The partitions U incline downward from their outer edges toward the center, and have openings in their centers for the passage of the cap-tube N, the said openings being made larger than the said cap-tube, so that the water will flow freely from the upper to the lower compartments of the said bucket. The bucket S is provided with a number of tubes, V, open at both ends, the lower ends of which are placed near the bottom of the said bucket S. The tubes V pass up vertically through the partitions U, except the upper partition, and their upper ends are curved outward and secured in openings in the wall of the bucket S near its top.

Upon the main shaft L, below the bottom of the tank A, is placed a beveled gear-wheel, W, which is connected with the said shaft by a key and groove, so that the shaft L can slide up and down freely through the said gear-wheel, but will be carried around by and with the said gear-wheel in its revolution. Into the teeth of the beveled gear-wheel W mesh the teeth of the beveled gear-wheel X, attached to the inner end of the horizontal shaft Y, which revolves and slides in bearings in hangers Z, attached to the bottom of the tank A or to the top plate of the frame B, so that the main shaft L and the basket G can be revolved by revolving the said shaft Y.

To the shaft Y, near its outer end, is attached a long pinion-wheel, $a$, into the teeth of which mesh the teeth of a gear-wheel, $b$, journaled to brackets attached to the tank A. With the gear-wheel $b$ is rigidly connected a pinion-wheel, $c$, into the teeth of which mesh the teeth of the gear-wheel $d$, also journaled to a bracket attached to the tank A.

With the gear-wheel $d$ is connected a crank, $e$, so that the main shaft L and the basket G can be revolved rapidly by a slow movement of the crank $e$. The pinion-wheel $a$ is made long to prevent it from being thrown out of gear by the longitudinal movement of the shaft Y. To the outer end of the shaft Y is attached a fly-wheel, $f$, to give steadiness of motion to the basket.

$g$ is a lever which is pivoted to a support attached to the bottom of the tank A, and the forked inner end of which engages with the shaft Y between two collars formed upon or attached to the said shaft, or with a groove formed in the said shaft, so that the said shaft can be readily moved to throw the gear-wheels X W into and out of gear.

To the upper end of the spindle J is attached a gear-wheel, $h$, the teeth of which mesh into the teeth of an intermediate gear-wheel, $i$, journaled to the spider I. The teeth of the intermediate gear-wheel, $i$, mesh into the teeth of the gear-wheel $j$, pivoted to a journal, $k$, attached to the spider I. The gear-wheel $j$ is held up by a spiral spring, $l$, placed upon the journal $k$ between the said gear-wheel $j$ and the spider I. The gear-wheels $i\,j$ are so arranged that when the shaft L and basket G are raised the teeth of the gear-wheel $j$ will mesh into the teeth of the stationary internally-toothed gear-wheel $m$, attached to the top of the tank A around its central opening, so that the bucket S and spindle J will be revolved by the revolution of the basket G and shaft L.

The spiral spring $l$ allows the gear-wheel $j$ to yield should its teeth, when the shaft L and its attachments are raised, be in such a position as to strike the teeth of the stationary gear-wheel $m$, and causes them to rise into the spaces between the said teeth as soon as the rotary movement has brought them immediately below the said spaces.

To the upper side of the beveled gear-wheel W is rigidly attached a large gear-wheel, $n$, the teeth of which mesh into the teeth of three or more intermediate gear-wheels, $o$, pivoted to studs $p$, attached to lugs formed upon the plate $q$, hereinafter described. The teeth of the intermediate gear-wheels, $o$, mesh into the teeth of the gear-wheels $r$, attached to the lower ends of the pump-shafts $s$, which lower ends are pointed and revolve in sockets in brackets $t$, attached to the bottom of the tank A.

The pump-shafts $s$ pass up through holes in the bottom of the tank A, and revolve in bearings in the thickened ends of the tubes $u$, the lower ends of which are secured to the tank-bottom around the holes through which the said pump-shafts pass to prevent water from leaking out around the said shafts. The space between the thickened ends of the guard-tubes $u$ is filled with strips, $v$, of pine or other suitable porous wood, forming a tubular packing. The strips $v$ are saturated with oil before being placed in the tubes $u$, and the shafts $s$ have spiral grooves formed in them to take the oil that percolates through the strips $v$ and carry it to the upper part of the guard-tubes $u$, to again percolate through the said strips, so that the said shafts will be kept lubricated. The upper ends of the pump-shafts $s$ pass through the closed upper ends of the cap-tubes $w$, which closed ends are secured to the pump-shafts by set-screws or other suitable means, so that the said shafts will carry the said cap-tubes with them in their revolution. The cap-tubes $w$ do not extend quite to the bottom of the tank A, and to their lower parts are attached spiral flanges $x$, so that the said spiral flanges will be revolved by and with the pump-shafts $s$.

The upper ends of the pump-shafts $s$ are pointed and revolve in sockets in the closed upper ends of the casings $y$, the lower parts of which are enlarged to inclose the flanges $x$. The lower ends of the casings $y$ do not extend quite to the bottom of the tank A, space being left for the free entrance of water. The lower ends of the casings $y$ are attached to brackets $z$, attached to the tank-bottom to firmly support the said casings and hold them securely in place. In holes in the outer sides of the upper ends of the casings $y$ are secured short nozzles 1, through which the water forced up through the casings $y$ by the flanges $x$, when the pump-shafts $s$ are revolved, will be discharged upon the dishes in the basket G.

The water in the tank A and in the bucket S is heated by lamps 2, supported in brackets 3, which are hinged to hangers 4, attached to the bottom of the tank A or to the top plate of the frame B, so that the said lamps 2 can be readily swung beneath the open lower ends of the flues 5, which are secured at their upper ends to the bottom of the tank A around openings formed in the said bottom. In the sides of the lower part of the flues 5 are formed openings 6, covered with mica or other suitable material, so that the blaze of the lamps can be seen.

To the bottom of the tank A, around the openings with which the upper ends of the flues 5 are connected, are attached the lower ends of the flues 7, which serve as continuations of the flues 5, and which pass up spirally through the space between the basket G and the bucket S. The open upper ends of the flues 7 are covered by an annular plate, 8, concaved upon the lower side, and supported by brackets attached to the flues 7, to prevent water from spattering into the said upper ends. The adjacent ends of the flues 5 7 are so arranged as to form shoulders 9, against which the products of combustion from the lamps 2 strike, and which, in connection with the spiral shape of the flues 7, cause the said flues 7 to be so heated that any water that may spatter into the upper ends of the said flues will be converted into steam before it can reach the lamps 2.

To the outer sides of the spiral flues 7 are attached flanges 10, and to the bottom of the tank A are attached flanges 11, which flanges 10 11 are inclined to the rearward or toward the direction from which the adjacent parts of the basket G are moving. As the basket G, loaded with dishes, is revolved through the water in the tank A, the movement of the said basket, the flanges P Q R, attached to the basket, the stationary flanges 10 11, and the wings O produces currents in the water which strike the dishes in different directions and wash them clean in a very short time.

To the horizontal shaft Y is attached a small gear-wheel, 12, in such a position that when the said shaft is drawn outward to withdraw the beveled gear-wheel X from the beveled gear-wheel W, and throw the basket out of gear with the mechanism that revolves it, the teeth of the said gear-wheel 12 will mesh into the teeth of the crown-wheel 13, attached to the plate $q$. With the lower side of the plate $q$ are connected, by ball-and-socket joints, the upper ends of three or more spirally-curved bars, 14, the lower ends of which are connected by ball-and-socket joints with the plate 15. The lower end of the main shaft L passes through an aperture in the center of the plate 15, and to the said plate are rigidly attached the upper ends of three or more vertical rods, 16, which pass down through guide-holes in a bracket or frame, 17, attached to the frame B.

To the lower ends of the vertical rods 16 are pivoted the lower ends of the lazy-tongs 18, which are fulcrumed to a bracket, 19, attached to the frame B. The upper ends of the lazy-tongs 18 are pivoted to a plate, 20, through the center of which passes and to which is rigidly attached the step 21, that carries the main shaft L. With this construction, when the plate $q$ is turned, the tendency is to bring the spiral rods 14 toward a vertical position, which movement forces the plate 15 and rods 16 downward, and operates the lazy-tongs 18, which raise the step 21 and the main shaft L, lifting the basket G out of the water in the tank A.

The upward pressure of the plate $q$ is resisted by the plate 22, which is connected with the tank A by the hangers 23. The friction between the plates $q$ 22 is lessened by small friction-rollers 24, pivoted to the plate 22, and against which the plate $q$ rests.

The movement of the plate 22 carries the intermediate gear-wheels, $o$, out of gear with the gear-wheels $r$, so that the pumps will not be operated when the basket is rotated in its raised position.

To the upper part of the tank A and directly over the basket G is secured an annular plate, 25, through which are formed numerous perforations, so that when the bucket S is raised and rotated and the water discharged from the said buckets through the pipes V by centrifugal force will be received upon the plate 25 and distributed through its perforations upon the dishes in the basket G, rinsing them quickly and thoroughly.

From the lower ends of the rods 16 is suspended a cup, 26, to receive any oil that may drip from the step 21. The water can be withdrawn from the tank A through a discharge-tube connected with an opening in the tank-bottom, which opening is closed by a plug, 27, operated by a rod, 28, and lever 29, or other suitable means. In a similar manner any water not discharged from the bucket S through the tubes V and left in the bottom of the said bucket can be drawn off.

To the basket G is secured by spring-wire catches or other suitable means, a wire-gauze pocket 30, to receive soap for soaping the water in which the dishes are washed.

In using the machine the dirty dishes are placed in the basket G, the tank A and bucket S having previously been supplied with water, and the said basket is revolved by operating the driving mechanism. When the dishes are clean the shaft Y is drawn outward, throwing the basket G out of gear and the crown-wheel 13 into gear, so that as the shaft Y is again turned the plate $q$ will be turned to operate the lazy-tongs and raise the basket G, to throw the pumps out of gear and to throw the bucket into gear with the stationary internally-toothed gear-wheel $m$. The shaft Y is then pushed inward, throwing the basket G again into gear, and is turned to revolve the basket G and bucket S and rinse the dishes. Any water that may be in the tank A or bucket S is then drawn off and the machine is instantly dried by the heat from the lamps 2. The basket G is then revolved again and the dishes will be quickly dried, after which the basket is again lowered and the dishes can be removed or left in the machine until wanted.

Having thus fully described my invention, I claim as new and desire to secure by Letters Patent—

1. A dish-washing machine constructed substantially as herein shown and described, and consisting of a dish-water tank, a rotary rinsing-water bucket having transverse partitions and discharge-pipes, a basket to receive the dishes, pumps to discharge water over the dishes, lamp-heated flues, and an operating mechanism, as set forth.

2. In a dish-washing machine, the combination, with the tank A, having flanges 11, the heating-flues 7, having flanges 10, the basket G, having flanges P Q R, the main shaft L, and a driving mechanism, of the upright bars H, the curved wings O, and the cap-tube N, carrying the said wings and attached to the said shaft, substantially as herein shown and described, whereby the dish-receiving basket will be rotated and currents of water will be directed against the dishes as they are carried around by the said basket, as set forth.

3. In a dish-washing machine, the combination, with the tank A, the rotary dish-receiving basket G, and a driving mechanism, of the pump-shafts $s$, the guard-tubes $u$, the cap-tubes $w$, having spiral flanges $x$, and the casings $y$, having discharge-nozzles 1 at their upper ends, substantially as herein shown and described, whereby water will be discharged over the dishes as they are carried around in the said basket, as set forth.

4. In a dish-washing machine, the combination, with the tank A, provided with an internally-toothed stationary gear-wheel, $m$, at its top, the rotary basket G, and the main shaft L, of the bucket S, having transverse partitions U and discharge-pipes V, the spindle J, journaled to the said main shaft L, and the gear-wheels H $i j$, carried by the spider attached to the upright bars carrying the basket, substantially as herein shown and described, whereby the said bucket will be rotated to discharge its water by the revolution of the said basket and main shaft, as set forth.

5. In a dish-washing machine, the combination, with the tank A, the rotary basket G, carrying the dishes, and the bucket S, carrying the rinsing-water, of the annular perforated plate 25, attached to the said tank, substantially as herein shown and described, whereby the water discharged from the said bucket will be distributed over the dishes, as set forth.

6. In a dish-washing machine, the combination, with the tank A and the bucket S, of the spiral flues 7, the cap-plate 8, the lamp-flues 5, the lamps 2, and a supporting mechanism, substantially as herein shown and described, whereby the water in the said tank and bucket is heated and kept hot, as set forth.

7. In a dish-washing machine, the heating-flues 5 7, made, substantially as herein shown and described, with shoulders 9 and with their upper parts spiral, whereby any water that may spatter into the said flues will be vaporized before it can reach the lamps, as set forth.

8. In a dish-washing machine, the combination, with the main shaft L and the drive-shaft Y, of the gear-wheels 12 13, the plate $q$, the spirally-bent pivoted bars 14, the plate 15, pivoted to the said bars, the vertical rods 16, attached to the said plate, the lazy-tongs 18, the fulcrum-bracket 19, and the step 21, substantially as herein shown and described, whereby the shaft, basket, and bucket can be readily raised or lowered and the pumps thrown into and out of gear, as set forth.

ALLEN G. INGALLS.

Witnesses:
THS. BRASSARD,
W. R. LINDSAY.